United States Patent [19]
Naitou

[11] Patent Number: 5,427,261
[45] Date of Patent: Jun. 27, 1995

[54] WARPAGE CORRECTING CONSTRUCTION FOR ELECTRICAL CONNECTION BOX

[75] Inventor: Tsutomu Naitou, Mie Pref, Japan
[73] Assignee: Sumnitomo Wiring Systems, Ltd., Yokkaichi, Japan
[21] Appl. No.: 249,253
[22] Filed: May 25, 1994
[30] Foreign Application Priority Data
  Jul. 1, 1993 [JP] Japan .................. 5-036245 U
[51] Int. Cl.⁶ .............................................. H02G 3/08
[52] U.S. Cl. ................................. 220/3.8; 220/306; 220/394
[58] Field of Search ............ 220/306, 307, 254, 4.21, 220/4.24, 3.8, 3.94.3.2

[56] References Cited
U.S. PATENT DOCUMENTS

| | | | |
|---|---|---|---|
| 3,083,857 | 4/1963 | Clark ........................... | 220/3.8 |
| 3,400,226 | 9/1968 | Krumreich et al. ........... | 220/4.21 |
| 3,515,306 | 6/1970 | Roper et al. .................. | 220/306 |
| 4,896,784 | 1/1990 | Heath ........................... | 220/3.8 |
| 4,905,861 | 3/1990 | Boxall et al. ................. | 220/306 |
| 5,050,754 | 9/1991 | Marino ......................... | 220/306 |
| 5,143,219 | 9/1992 | Yates, Jr. ...................... | 220/306 |
| 5,258,889 | 11/1993 | Belanger, Jr. | |
| 5,360,130 | 11/1994 | Lehmann et al. .............. | 220/3.8 |
| 5,373,955 | 12/1994 | Marino ......................... | 220/306 |

Primary Examiner—Stephen J. Castellano
Attorney, Agent, or Firm—Sandler, Greenblum & Bernstein

[57] ABSTRACT

A warpage correcting construction for an electrical connection box including upper and lower casings molded by synthetic resin, comprising: a first locking claw projecting outwardly from an outer peripheral wall of the upper casing and including an upper end engagement face, a depression face and an oblique face; and a second locking claw projecting inwardly from an outer peripheral wall of the lower casing and including a lower end engagement face, a distal end face and an oblique face; the upper end engagement face of the first locking claw having a projecting distance larger than that of the lower end engagement face of the second locking claw so as to cause the depression face of the first locking claw to outwardly depress the outer peripheral wall of the lower casing at the time of engagement between the upper end engagement face of the first locking claw and the lower end engagement face of the second locking claw such that inward warpage of the outer peripheral wall of the lower casing is corrected.

2 Claims, 4 Drawing Sheets

WARPAGE CORRECTING CONSTRUCTION FOR ELECTRICAL CONNECTION BOX

BACKGROUND OF THE INVENTION

The present invention generally relates to a warpage correcting construction for an electrical connection box and more particularly, to an electrical connection box requiring waterproofing due to its provision in an engine compartment, etc. of a motor vehicle and having a casing molded by synthetic resin, in which by correcting warpage produced on the casing, production of a gap in the casing is prevented such that waterproofing performance of the casing is improved.

In a known electrical connection box of this kind, electrical connection components such bus bars, relays connected to the bus bars, etc. are accommodated in a casing constituted by upper and lower casings molded by synthetic resin. Usually, the upper and lower casings are locked to each other such that an outer peripheral wall of the lower casing is disposed outside and below an outer peripheral wall of the upper casing.

As shown in FIGS. 1 and 2, in this prior art locking construction, for example, a locking claw 1b projecting inwardly from an outer peripheral wall 1a of a lower casing 1 and a locking claw 2b projecting outwardly from an outer peripheral wall 2a of an upper casing 2 are provided so as to be brought into engagement with each other such that the lower casing 1 and the upper casing 2 are locked to each other.

In case the above mentioned electrical connection box is provided in an engine compartment of a motor vehicle, water readily penetrates into the electrical connection box. Therefore, the electrical connection box is required to be not only waterproofed but arranged to easily drain penetrated water outwardly. Thus, various measures for waterproofing and drainage have been taken for the electrical connection box.

For example, when an upper cover 3 is further mounted on the lower casing 1, a rubber seal 4 is provided between an upper edge 1c of the outer peripheral wall 1a of the lower casing 1 and the upper cover 3.

Each of the lower casing 1 and the upper casing 2 is formed through integral molding by using molds. However, in the lower casing 1 in which the outer peripheral wall 1a extends up to a considerable height from an outer peripheral edge of a bottom wall and an upper end of the lower casing 1 is open, the outer peripheral wall 1a is likely to warp inwardly. Especially, at a portion of the outer peripheral wall 1a above the locking claw 1b for its engagement with the upper casing 2, this warpage of the outer peripheral wall 1a increases. Furthermore, if the outer peripheral wall 1a has a long side, warpage of the outer peripheral wall 1a increases at a central portion of the long side.

Warpage of the outer peripheral wall 1a is produced mainly by the following cause. Namely, when the lower casing 1 is molded by filling synthetic resin between an inner mold and an outer mold, the inner mold reaches high temperature but the outer mold is held at relatively low temperature. By this temperature difference between the inner mold and the outer mold, the outer peripheral wall 1a of the lower casing 1 warps inwardly as shown in FIGS. 3 and 4.

If the outer peripheral wall 1a of the lower casing 1 warps, it is difficult to bring the locking claw 1b of the lower casing 1 and the locking claw 2b of the upper casing 2 into engagement with each other. Meanwhile, even if the locking claw 1b of the lower casing 1 and the locking claw 2b of the upper casing 2 are brought into engagement with each other, a gap is readily produced between the lower casing 1 and the upper casing 2. Furthermore, as shown in FIG. 3, since a gap may be produced also between the lower casing 1 and the upper cover 3 in spite of the rubber seal 4, water penetrates into the electrical connection box through this gap.

In order to eliminate warpage of the outer peripheral wall 1a of the lower casing 1, it is necessary to design molds for the lower casing 1 in view of the warpage. However, since high accuracy is required for this design of the molds for the lower casing 1, production cost of the molds rises and the molds cannot be produced quickly.

SUMMARY OF THE INVENTION

Accordingly, an essential object of the present invention is to provide, with a view to eliminating the above mentioned drawbacks inherent in conventional electrical connection boxes, an electrical connection box having a construction in which it is possible to quite easily correct warpage produced on the electrical connection box.

In order to accomplish this object of the present invention, a warpage correcting construction for an electrical connection box including upper and lower casings molded by synthetic resin, according to the present invention comprises: a first locking claw which projects outwardly from an outer surface of an outer peripheral wall of the upper casing and includes an upper end engagement face projecting horizontally from the outer surface of the outer peripheral wall of the upper casing, a depression face extending vertically downwardly from a distal end of the upper end engagement face and an oblique face inclined downwardly from a lower end of the depression face to the outer surface of the outer peripheral wall of the upper casing; and a second locking claw which projects inwardly from an inner surface of an outer peripheral wall of the lower casing and includes a lower end engagement face projecting horizontally from the inner surface of the outer peripheral wall of the lower casing, a distal end face extending vertically upwardly from a distal end of the lower end engagement face and an oblique face inclined upwardly from an upper end of the distal end face to the inner surface of the outer peripheral wall of the lower casing; the upper end engagement face of the first locking claw of the upper casing and the lower end engagement face of the second locking claw of the lower casing being brought into engagement with each other such that the upper and lower casings are locked to each other; wherein the upper end engagement face of the first locking claw of the upper casing has a projecting distance larger than that of the lower end engagement face of the second locking claw of the lower casing so as to cause the depression face of the first locking claw of the upper casing to outwardly depress the inner surface of the outer peripheral wall of the lower casing at the time of engagement between the upper end engagement face of the first locking claw of the upper casing and the lower end engagement face of the second locking claw of the lower casing such that inward warpage of the outer peripheral wall of the lower casing is corrected.

The projecting distance of the locking claw of the upper casing should be determined based on amount of warpage of the outer peripheral wall of the lower casing. Thus, it is preferable that a locking claw provided at a portion of the outer peripheral wall of the upper casing corresponding to large warpage of the outer peripheral wall of the lower casing, e.g., a locking claw provided at a central portion of a long side of the outer peripheral wall of the upper casing is so set as to have a projecting distance larger than that of a locking claw provided at a portion of the outer peripheral wall of the upper casing corresponding to smaller warpage of the outer peripheral wall of the lower casing. In case the projecting distance of the locking claw of the upper casing is increased, overall length and angle of inclination of the oblique face of the locking claw of the upper casing should be, respectively, increased and reduced such that engagement force required for locking the upper and lower casings to each other does not become excessively large.

In accordance with the present invention, since the projecting distance of the locking claw projecting outwardly from the outer peripheral wall of the upper casing is so set as to be larger than that of the locking claw projecting inwardly from the outer peripheral wall of the lower casing, the locking claw of the upper casing is brought into contact with the outer peripheral wall of the lower casing so as to outwardly depress the outer peripheral wall of the lower casing, so that inward warpage of the outer peripheral wall of the lower casing can be corrected. Therefore, the outer peripheral wall of the lower casing can be held linearly. Thus, in case a rubber seal is provided between the lower casing and an upper cover, an upper edge of the outer peripheral wall of the lower casing is held in contact with the rubber seal so as to eliminate a gap between the rubber seal and the upper edge of the outer peripheral wall of the lower casing. Therefore, waterproofing performance of the electrical connection box can be improved.

BRIEF DESCRIPTION OF THE DRAWINGS

These object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
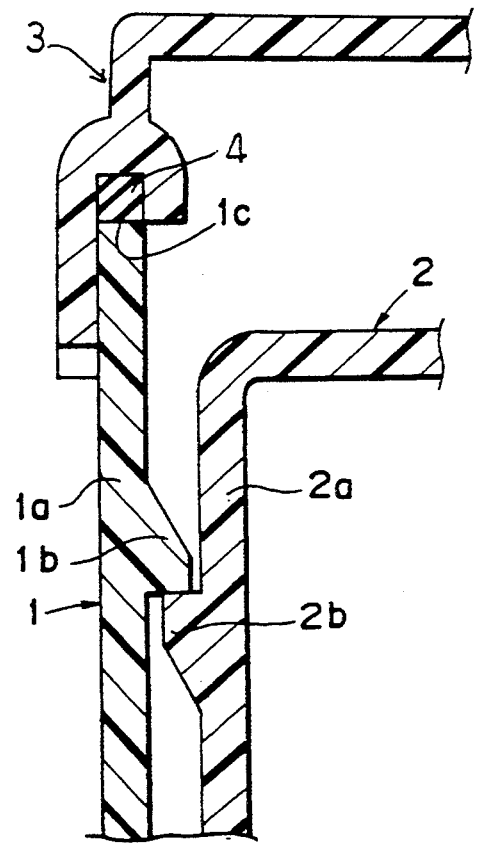
FIG. 1 is a fragmentary sectional view of a prior art electrical connection box (already referred to)
Figure 2:
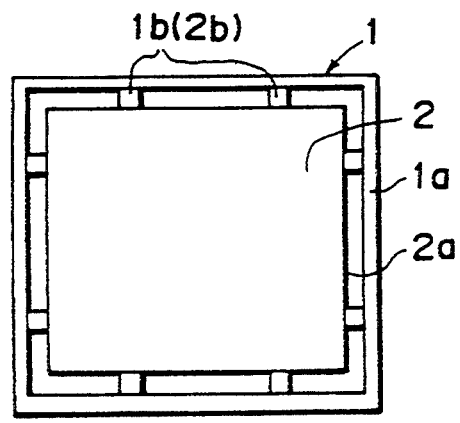
FIG. 2 is a schematic top plan view of the prior art electrical connection box of FIG. 1 (already referred to)
Figure 3:
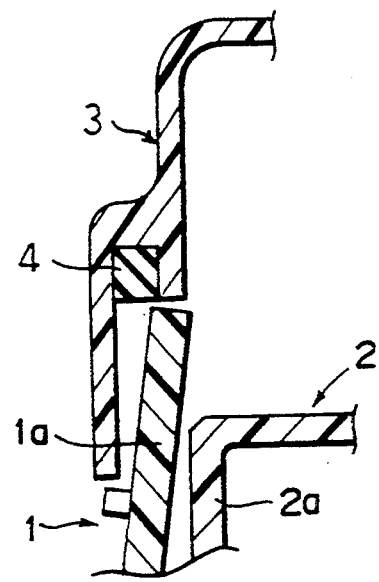
FIG. 3 is a fragmentary sectional view showing warpage produced on the prior art electrical connection box of FIG. 1 (already referred to)
Figure 4:
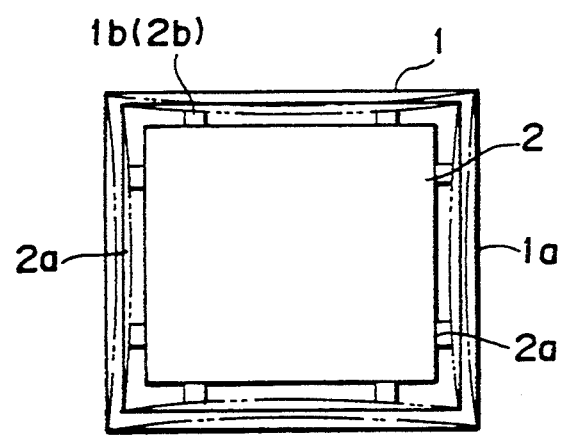
FIG. 4 is a schematic top plan view showing warpage produced on the prior art electrical connection box of FIG. 1 (already referred to)
Figure 5:
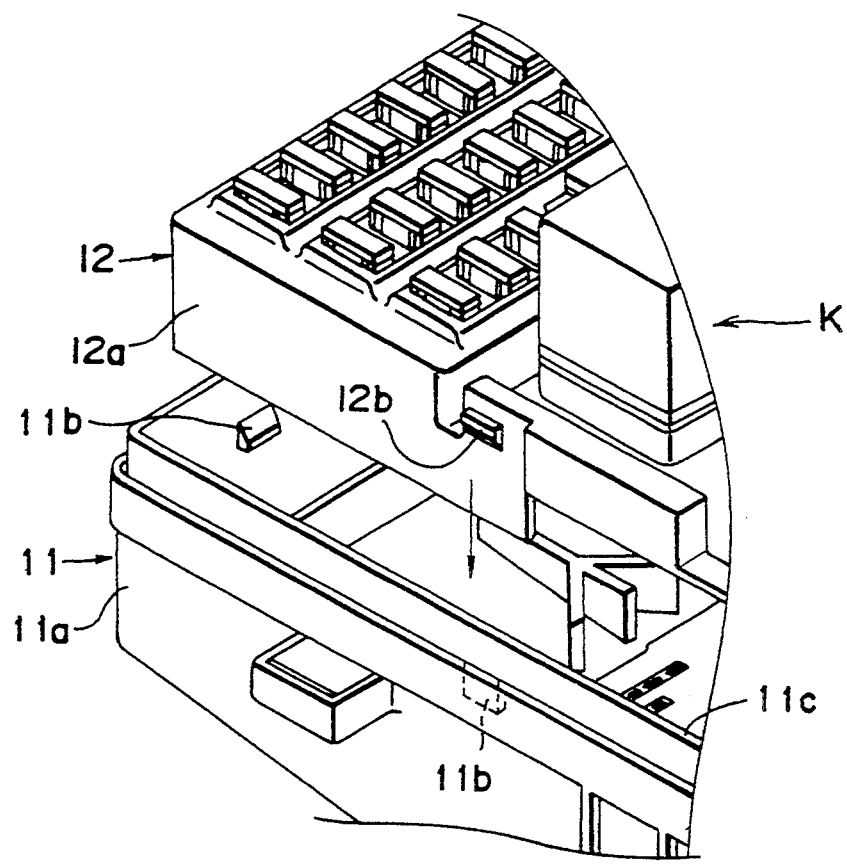
FIG. 5 is a fragmentary perspective view of an electrical connection box according to the present invention.
Figure 6:
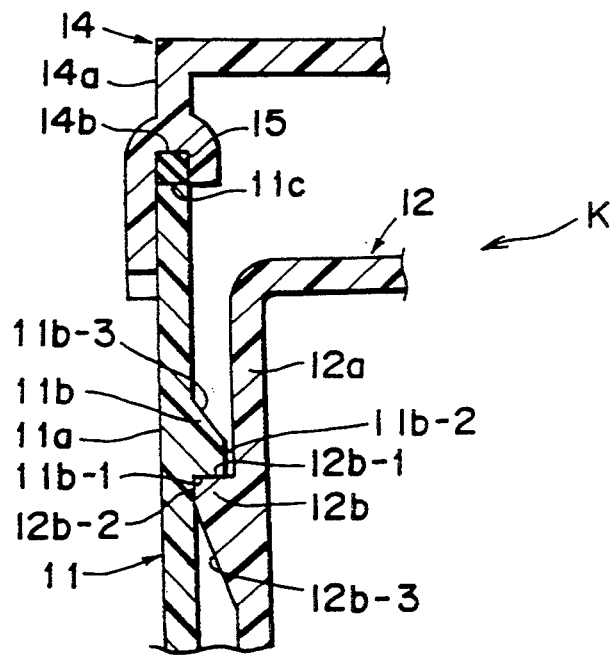
FIG. 6 is a fragmentary sectional view of the electrical connection box of FIG. 5.
Figure 7:
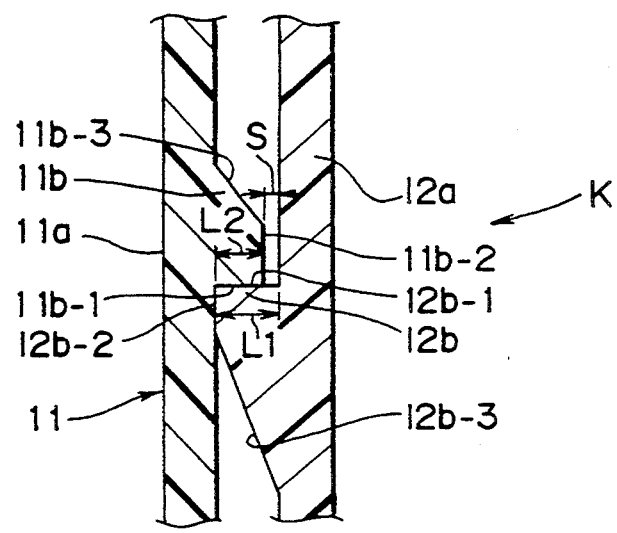
FIG. 7 is an enlarged fragmentary sectional view of the electrical connection box of FIG. 5.

Referring now to the drawings, there is shown in FIGS. 5 to 7, an electrical connection box K according to one embodiment of the present invention. The electrical connection box K includes a lower casing 11 and an upper casing 12 which are molded by synthetic resin. The upper casing 12 is fitted into the lower casing 11 such that electrical connection components (not shown) such as bus bars, relays, etc. are accommodated in the electrical connection box K. A downwardly extending outer peripheral wall of an upper cover 14 is fitted around an upper end portion of an outer surface of an outer peripheral wall 11a of the lower casing 11 such that the upper cover 14 is mounted on an upper end of the lower casing 11.

A locking claw 11b projects inwardly from a predetermined location on an inner surface of the outer peripheral wall 11a of the lower casing 11. The locking claw 11b is formed by a lower end engagement face 11b-1 extending horizontally from the outer peripheral wall 11a, a distal end face 11b-2 extending vertically upwardly from a distal end of the lower end engagement face 11b-1 and an oblique face 11b-3 inclined upwardly from an upper end of the distal end face 11b-2 to the outer peripheral wall 11a.

A locking claw 12b projects outwardly from an outer surface of an outer peripheral wall 12a of the upper casing 12 so as to confront the locking claw 11b of the lower casing 11. The locking claw 12b is formed by an upper end engagement face 12b-1 extending horizontally from the outer peripheral wall 12a, a depression face 12b-2 extending vertically downwardly from a distal end of the upper end engagement face 12b-1 and an oblique face 12b-3 inclined downwardly from a lower end of the depression face 12b-2 to the outer peripheral wall 12a.

The upper end engagement face 12b-1 of the locking claw 12b of the upper casing 12 projects from the outer surface of the outer peripheral wall 12 so as to be brought into engagement with the lower end engagement face 11b-1 of the lower casing 11 when the upper casing 12 has been fitted into the lower casing 11. As shown in FIG. 7, the upper end engagement face 12b-1 of the locking claw 12b of the upper casing 12 projects from the outer surface of the outer peripheral wall 12a through a projecting distance L1, while the lower end engagement face 11b-1 of the locking claw 11b of the lower casing 11 projects from the inner surface of the outer peripheral wall 11a through a projecting distance L2. The projecting distance L1 of the locking claw 12b is so set as to be larger than the projecting distance L2 of the locking claw 11b by about 20%. Furthermore, the oblique face 12b-3 of the locking claw 12b has an overall length larger than that of the oblique face 11b-3 of the locking claw 11b and an angle of inclination smaller than that of the oblique face 11b-3 of the locking claw 11b.

As shown in FIG. 6, the upper cover 14 has an open bottom face. A recess 14b engageable with an upper edge 11c of the lower casing 11 is formed at a lower end of an outer frame 14a of the upper cover 14 and a rubber seal 15 is inserted into the recess 14b such that the outer peripheral wall of the upper cover 14 is fitted around the lower casing 11 through an engagement portion (not shown).

Hereinbelow, assembly steps of the electrical connection box K of the above described arrangement are described. Initially, the upper casing 12 is inserted into the lower casing 11 from above. At the time of insertion of the upper casing 12 into the lower casing 11, the oblique face 12b-3 of the locking claw 12b of the upper casing 12 is initially brought into contact with the oblique face 11b-3 of the locking claw 11b of the lower casing 11. When the upper casing 12 is further depressed into the lower casing 11 downwardly, the upper casing 12 is lowered through slide of the depression face 12b-2 on the distal end face 11b-2 and thus, the upper end engagement face 12b-1 of the locking claw 12b is brought into engagement with the lower end engagement face 11b-1 of the locking claw 11b such that the upper casing 12 and the lower casing 11 are locked to each other in a state where the upper casing 12 is fitted into the lower casing 11.

Since the oblique face 12b-3 of the locking claw 12b has an overall length larger than that of the oblique face 11b-3 of the locking claw 11b but an angle of inclination smaller than that of the oblique face 11b-3 of the locking claw 11b as described above, force required for bringing the locking claws 11b and 12b into engagement with each other is lessened and thus, the locking claws 11b and 12b can be brought into engagement with each other easily.

Subsequently, the upper cover 14 is mounted on the upper edge 11c of the lower casing 11 to which the upper casing 12 is locked. Thus, assembly of the electrical connection box K is completed.

In this assembled state of the electrical connection box K, since the projecting distance L1 of the locking claw 12b of the upper casing 12 is so set as to be larger than the projecting distance L2 of the locking claw 11b of the lower casing 11 as shown in FIG. 7, the depression face 12b-2 of the locking claw 12b is held in contact with the inner surface of the outer peripheral wall 11b of the lower casing 11 so as to outwardly depress the inner surface of the outer peripheral wall 11a of the lower casing 11. As a result, a predetermined gap S is defined between the distal end face 11b-2 of the locking claw 11b of the lower casing 11 and the outer surface of the outer peripheral wall 12a of the upper casing 12.

The outer peripheral wall 11a of the lower casing 11 is depressed outwardly by the locking claw 12b of the upper casing 12 as described above. Thus, even if inward warpage is produced on the outer peripheral wall 11a of the lower casing 11 during molding of the lower casing 11, the outer peripheral wall 11a of the lower casing 11 is depressed outwardly by the locking claw 12b of the upper casing 12 so as to be corrected to a normal position through elimination of the inward warpage of the outer peripheral wall 11a of the lower casing 11. As a result, the outer peripheral wall 11a of the lower casing 11 is held linearly. Hence, the upper edge 11c of the outer peripheral wall 11a of the lower casing 11 is positively brought into contact with the rubber seal 15 inserted into the recess 14b of the upper cover 14 so as to securely seal the electrical connection box K such that rainwater, etc. do not penetrate into the electrical connection box K.

Meanwhile, the gap S is defined between the distal end face 11b-2 of the locking claw 11b of the lower casing 11 and the outer surface of the outer peripheral wall 12a of the upper casing 12. Therefore, when the upper casing 12 is removed from the lower casing 11, a jig for removing the upper casing 12 from the lower casing 11 can be inserted into the gap S.

The electrical connection box of the present invention is not restricted to the above described structure. Projecting distance of the locking claw of the upper casing should be determined based on amount of warpage of the outer peripheral wall of the lower casing. For example, when a locking claw is provided at a portion of the outer peripheral wall of the upper casing corresponding to large warpage of the outer peripheral wall of the lower casing, e.g., at a central portion of a long side of the outer peripheral wall of the upper casing, projecting distance of the locking claw of the upper casing should be so set as to be larger than that of a locking claw provided at a portion of a side of the outer peripheral wall of the upper casing corresponding to smaller warpage of the outer peripheral wall of the lower casing. Furthermore, the overall length and angle of inclination of the oblique face of the locking claw of the upper casing should be, respectively, increased and reduced in accordance with the projecting distance of the locking claw of the upper casing.

As is clear from the foregoing description of the electrical connection box of the present invention, the projecting distance of the locking claw of the upper casing is so set as to be larger than that of the locking claw of the lower casing such that the distal end face of the locking claw of the upper casing is brought into contact with the inner surface of the outer peripheral wall of the lower casing. Thus, since the inwardly warping outer peripheral wall of the lower casing is depressed outwardly by the locking claw of the upper casing, the outer peripheral wall of the lower casing can be corrected to a normal position. As a result, since no gap is produced between the upper edge of the lower casing and the rubber seal inserted into the recess of the upper cover, it is possible to prevent penetration of rainwater, etc. into the electrical connection box positively.

Meanwhile, in order to mold the lower casing, either molds produced in view of warpage of the lower casing or special molds leading to less warpage of the lower casing is not required to be used, thereby resulting in reduction of production cost of molds for the lower casing.

In addition, the gap is formed between the distal end face of the locking claw of the lower casing and the outer surface of the outer peripheral wall of the upper casing. Therefore, when the upper casing is removed from the lower casing, a jig for removing the upper casing from the lower casing can be inserted into the gap and thus, working efficiency for removing the upper casing from the lower casing is improved advantageously.

What is claimed is:

1. An enclosure with a warpage correcting construction for an electrical connection box, said enclosure comprising:

upper and lower casings molded from synthetic resin;

a first locking claw which projects outwardly from an outer surface of an outer peripheral wall of the upper casing and includes an upper end engagement face projecting horizontally from the outer surface of the outer peripheral wall of the upper casing, a depression face extending vertically downwardly from a distal end of the upper end engagement face and an oblique face inclined downwardly from a lower end of the depression face to the outer surface of the outer peripheral wall of the upper casing; and a second locking claw which projects inwardly from an inner surface of an outer peripheral wall of the lower casing and includes a lower end engagement face projecting horizontally from the inner surface of the outer peripheral wall of the lower casing, a distal end face extending vertically upwardly from a distal end of the lower end engagement face and an oblique face inclined upwardly from an upper end of the distal end face to the inner surface of the outer peripheral wall of the lower casing;

the upper end engagement face of the first locking claw of the upper casing and the lower end engagement face of the second locking claw of the lower casing being brought into engagement with each other such that the upper and lower casings are locked to each other;

wherein the upper end engagement face of the first locking claw of the upper casing has a projecting distance larger than that of the lower end engagement face of the second locking claw of the lower casing so as to cause the depression face of the first locking claw of the upper casing to outwardly depress the inner surface of the outer peripheral wall of the lower casing at the time of engagement between the upper end engagement face of the first locking claw of the upper casing and the lower end engagement face of the second locking claw of the lower casing such that inward warpage of the outer peripheral wall of the lower casing is corrected.

2. The enclosure with a warpage correcting construction as claimed in claim 1, wherein the oblique face of the first locking claw of the upper casing has an overall length larger than that of the oblique face of the second locking claw of the lower casing and an angle of inclination smaller than that of the oblique face of the second locking claw of the lower casing.

* * * * *

UNITED STATES PATENT AND TRADEMARK OFFICE
CERTIFICATE OF CORRECTION

PATENT NO. : 5,427,261
DATED : June 27, 1995
INVENTOR(S) : Tsutomu NAITOU

It is certified that error appears in the above-indentified patent and that said Letters Patent is hereby corrected as shown below:

On the title page, in section [73], "Assignee", line 1, change "Sumnitomo" to ---Sumitomo---.

Signed and Sealed this

Seventeenth Day of September, 1996

Attest:

BRUCE LEHMAN

*Attesting Officer*     *Commissioner of Patents and Trademarks*